US008135395B2

(12) United States Patent
Cassett et al.

(10) Patent No.: US 8,135,395 B2
(45) Date of Patent: Mar. 13, 2012

(54) METHODS AND APPARATUS FOR MONITORING CONFIGURABLE PERFORMANCE LEVELS IN A WIRELESS DEVICE

(75) Inventors: Tia Manning Cassett, San Diego, CA (US); Kenny Fok, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 561 days.

(21) Appl. No.: 11/374,889

(22) Filed: Mar. 13, 2006

(65) Prior Publication Data

US 2006/0217115 A1 Sep. 28, 2006

Related U.S. Application Data

(60) Provisional application No. 60/663,515, filed on Mar. 18, 2005, provisional application No. 60/664,669, filed on Mar. 22, 2005.

(51) Int. Cl.
*H04W 24/00* (2009.01)
(52) U.S. Cl. .................. 455/423; 455/424; 455/425
(58) Field of Classification Search ........... 455/423–425
See application file for complete search history.

(56) References Cited

U.S. PATENT DOCUMENTS

| 5,987,306 | A | 11/1999 | Nilsen et al. |
| 6,088,588 | A | 7/2000 | Osborne |
| 6,434,364 | B1 * | 8/2002 | O'Riordain ................. 455/67.11 |
| 6,445,917 | B1 * | 9/2002 | Bark et al. ..................... 455/423 |
| 6,754,470 | B2 * | 6/2004 | Hendrickson et al. ..... 455/67.11 |
| 7,369,846 | B2 * | 5/2008 | Koivukangas et al. ....... 455/425 |
| 2001/0007996 | A1 | 7/2001 | Dulai et al. |
| 2006/0203738 | A1 | 9/2006 | Fok et al. |

FOREIGN PATENT DOCUMENTS

| EP | 0804046 A2 | 10/1997 |
| EP | 1271903 A1 | 1/2003 |
| EP | 1309214 A1 | 5/2003 |
| JP | 2005502216 T | 1/2005 |
| WO | WO02047361 | 6/2002 |
| WO | WO03041422 | 5/2003 |

OTHER PUBLICATIONS

International Search Report and Written Opinion—PCT/US2006/010584, International Search Authority—European Patent Office—Aug. 30, 2006.

* cited by examiner

*Primary Examiner* — Rafael Pérez-Gutiérrez
*Assistant Examiner* — Yungsang Lau
(74) *Attorney, Agent, or Firm* — Stanton Braden

(57) ABSTRACT

Apparatus and methods may include a performance module operable to monitor and generate performance statistics on a wireless device based on a received monitoring configuration. In some aspects, the wireless device may forward the performance statistics to another device upon meeting predetermined threshold parameters. The performance statistics may be utilized to generate a performance report viewable by an authorized user.

56 Claims, 7 Drawing Sheets

METHODS AND APPARATUS FOR MONITORING CONFIGURABLE PERFORMANCE LEVELS IN A WIRELESS DEVICE

CLAIM OF PRIORITY UNDER 35 U.S.C. §119

The present application for patent claims priority to Provisional Application No. 60/663,515 entitled "Methods and Apparatus for Monitoring Configurable Performance Levels in a Wireless Device," filed Mar. 18, 2005, and to Provisional Application No. 60/664,669 entitled "Methods and Apparatus for Displaying Long-Term Performance Parameters for a Wireless Device," filed Mar. 22, 2005, both assigned to the assignee hereof and both hereby expressly incorporated by reference herein.

REFERENCE TO CO-PENDING APPLICATIONS FOR PATENT

The present application for patent is related to co-pending U.S. patent application Ser. No. 11/374,924, entitled "Apparatus and Methods for Providing Performance Statistics on a Wireless Communication Device," filed concurrently herewith, and expressly incorporated by reference herein.

BACKGROUND

The described embodiments generally relate to wireless communication devices and computer networks. More particularly, the described embodiments relate to the collecting performance statistics on a wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

Wireless devices are being manufactured with increased computing capabilities and are becoming tantamount to personal computers. These "smart" wireless devices, such as cellular telephones, have application programming interfaces ("APIs") installed onto their local computer platform that allow software developers to create software applications that operate on the cellular telephone. The API sits between the wireless device system software and the software application, making the cellular telephone functionality available to the application without requiring the software developer to have the specific cellular telephone system source code.

In the competitive world of cellular telephone carrier networks, proactive support of high revenue producing customers is desired in order to maintain and increase the profitability of the network carrier. Accordingly, it would be advantageous to provide apparatus and methods for monitoring predetermined performance levels in a wireless device.

SUMMARY

The described embodiments comprise apparatus, methods, computer readable media and processors operable to monitor wireless device performance statistics. Upon meeting a configurable threshold, the corresponding performance data may be automatically forwarded to another device, such as a remote server, that may alert authorized personnel at a customer support facility so they may take appropriate action to resolve any device-related and/or network-related issues corresponding to the performance data. Furthermore, based upon a predetermined reporting parameter, performance statistics from the wireless device may be uploaded to a predetermined device, such as the remote server, and the statistics may then be utilized to generate a summary report of performance.

In one aspect, a method of monitoring performance of a wireless device on a wireless network may comprise obtaining on a wireless device a monitoring configuration comprising a performance parameter and a threshold setting, the performance parameter associated with a performance statistic to be monitored, the threshold setting comprises a limit corresponding to the performance statistic; determining the performance statistic for the wireless device based upon the monitored performance parameter; comparing the determined performance statistic to the corresponding threshold setting; and generating a notification if the determined performance statistic meets the threshold setting.

In a related aspect, a machine readable medium may comprise instructions which, when executed by a machine, cause the machine to perform the above-stated operations. In another related aspect, at least one processor may be configured to perform the above-stated operations.

In a further aspect, a wireless device may comprise means for obtaining a monitoring configuration comprising a performance parameter and a threshold setting, the performance parameter associated with a performance statistic to be monitored, the threshold setting comprises a limit corresponding to the performance statistic; means for determining the performance statistic for the wireless device based upon the monitored performance parameter; means for comparing the determined performance statistic to the corresponding threshold setting; and means for generating a notification if the performance statistic meets the threshold setting.

In another aspect, a wireless device may comprise a memory and a performance module resident in the memory. The performance module may include a monitoring configuration comprising a performance parameter and a predetermined threshold setting, the performance parameter associated with a performance statistic to be monitored, the predetermined threshold setting comprises a limit corresponding to the performance statistic; monitoring logic operable to determine the performance statistic based upon the monitoring configuration; and reporting logic operable to generate a notification message when the performance statistic meets the predetermined threshold setting.

In yet another aspect, a method of monitoring performance of a wireless device may comprise generating a monitoring configuration executable to initiate monitoring, calculating and reporting of at least one performance statistic on a wireless device, the monitoring configuration identifying a performance parameter; forwarding the monitoring configuration for receipt by the wireless device; receiving a calculated performance statistic from the wireless device based on the monitoring configuration; and generating a performance report based on the received performance statistic.

In a related aspect, a machine readable medium may comprise instructions which, when executed by a machine, cause the machine to perform the above-stated operations. In another related aspect, at least one processor may be configured to perform the above-stated operations.

In a further aspect, an apparatus may comprise means for generating a monitoring configuration executable to initiate monitoring, calculating and reporting of at least one performance statistic on a wireless device, the monitoring configuration identifying a performance parameter; means for forwarding the monitoring configuration for receipt by the wireless device; means for receiving a calculated performance statistic from the wireless device based on the monitoring configuration; and means for generating a performance report based on the received performance statistic.

In still another aspect, an apparatus for managing the monitoring of wireless device performance comprises a configuration generator operable to generate and transmit a monitoring configuration for receipt by a wireless device, the monitoring configuration identifying a performance parameter to monitor; an information repository operable to receive and store wireless device performance statistics, the wireless device performance statistics comprising statistics associated with the performance parameter collected by the wireless device based on the monitoring configuration; and a performance manager control module comprising a report generator operable to generate a performance report based on the wireless device performance statistics.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
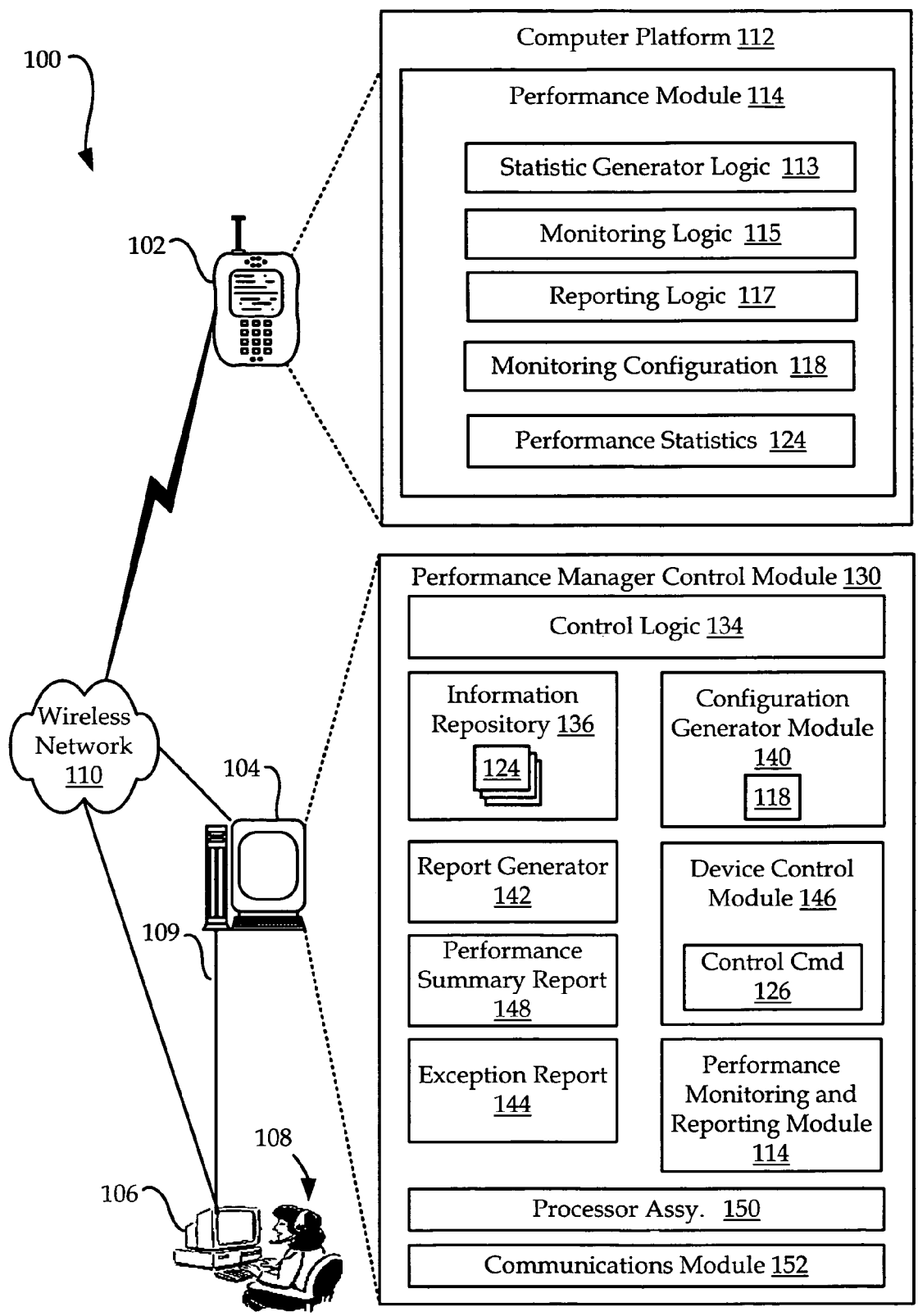
FIG. 1 is a schematic diagram of one aspect of a system for monitoring and reporting performance information for a wireless device.

FIG. 1 illustrates one aspect of a system 100 comprising apparatus and methods of monitoring and reporting statistics relating to the performance and usage of a wireless device with a wireless network based upon a downloaded performance monitoring configuration. System 100 is operable to monitor, tally, and upload wireless device-based performance data and statistics 124, which include wireless network-related statistics and wireless network independent statistics. For example, in some aspects, such performance data and statistics may include, but are not limited to, information relating to the performance and usage of: software applications on the wireless device, such as media applications, text messaging applications, voice-call applications, Internet access or web browser applications, and word processing and data management applications; hardware components on the wireless device, such as an input mechanism, such as a key, keyboard or voice recognition module, an output mechanism such as a display and a speaker, a power source such as a battery, a memory, a processor, etc. In other words, performance data and statistics may relate to air interface information, such as any data or communications between the device and a communications network and/or another device, as well as non-air interface information, such as functionality occurring on the device. Further, in some aspects, air interface performance data and statistics include, but are not limited to, connection quality information such as call drop-related information, access failure-related information, and service degradation-related information.

System 100 is operable to monitor predetermined performance data as directed by a monitoring configuration 118 generated by a performance manager server 104. The system 100 is further operable to notify, such as with an exception report 144, a predetermined party, such as a customer service representative, when predetermined performance thresholds 188 (FIG. 2) for monitored parameters 187 (FIG. 2) are met. For example, exception report 144 may be a message indicating that a given threshold has been met, and may additionally include the given performance statistic, the given threshold, and any other performance-related data and/or device status-related information. Additionally, system 100 may further generate a summary report 148 based upon analysis of the collected performance statistics 124. Additionally, reports may be available to authorized users online and by electronic media, e.g. electronic mail. These reports may be used, for example, to proactively support customers, evaluate the commitment of a network carrier in meeting Service Level Agreements (SLAs) and to monitor service and connection quality of high Average Revenue Per Unit (ARPU) customers.

Generally, system 100 may include a wireless device 102 comprising a performance module 114 in communication with a performance manager server 104 that provides device control functionality via a wireless network 110. Further, performance manager server 104 may be in communication with customer care workstation 106, operated by an authorized user 108, such as a customer service representative, a marketing representative and/or a field engineer. Authorized user 108 may be provided access to the functionality of performance manager server 104 via a wired connection 109 or through wireless network 110, and may further communicate with wireless device 102, for example, via customer care workstation 106.

Apparatus and methods of providing performance data may include monitoring performance-related parameters so as to determine performance statistics. As mentioned above, performance statistics may be network-related and/or network independent, and may deal with air interface information and/or non-air interface information. In aspects where connection quality is monitored, for example, performance-related parameters include, but are not limited to, information such as a number and/or rate (Number of Call Drops/Number of Call Successes) of call drops, a number and/or rate (Number of Access Failures/Number of Access Attempts) of access failures, and a number and/or rate (Number of Service Degradations/Number of Call Successes) of service degradations. In this case, for example, a "service degradation" comprises a temporary outage or a signal strength lower than a predetermined acceptable threshold occurring during an established communications connection with the wireless network, i.e. during a call or while in idle mode.

Further, the monitored performance parameters and/or statistics may be compared to a corresponding predetermined threshold, where for a given performance parameter the threshold may represent at least one threshold condition and at least one corresponding threshold value. For example, the threshold condition may be an operator, such as less than, greater than, equal to, and combinations thereof. Similarly, the threshold value may be a value that corresponds to a level of acceptability or a level of unacceptability. As such, or example, the threshold may be an upper limit, a lower limit, and/or a range. Such predetermined thresholds are user configurable, and may be downloaded from performance manager server 104. When the monitored parameter and/or statistic meets the corresponding predetermined threshold, then such a state may trigger logging of configured performance information and/or generating a notification to a predetermined party, such as a customer service representative, who may then investigate the condition to correct the problem. Further, the collected performance data may be included in the summary report, which may be used to track a predetermined group of wireless devices, such as similar model type device, devices operating in similar geographic regions or with similar network devices, and/or devices having any predetermined characteristic, such as devices associated with high average revenue users.

The activities performed by the herein-described apparatus and methods may be performed on any form of wireless device or computer module, including a wired or wireless communication portal, including without limitation, wireless modems, PCMCIA cards, access terminals, personal computers, telephones, or any combination or sub-combination thereof.

Figure 2:
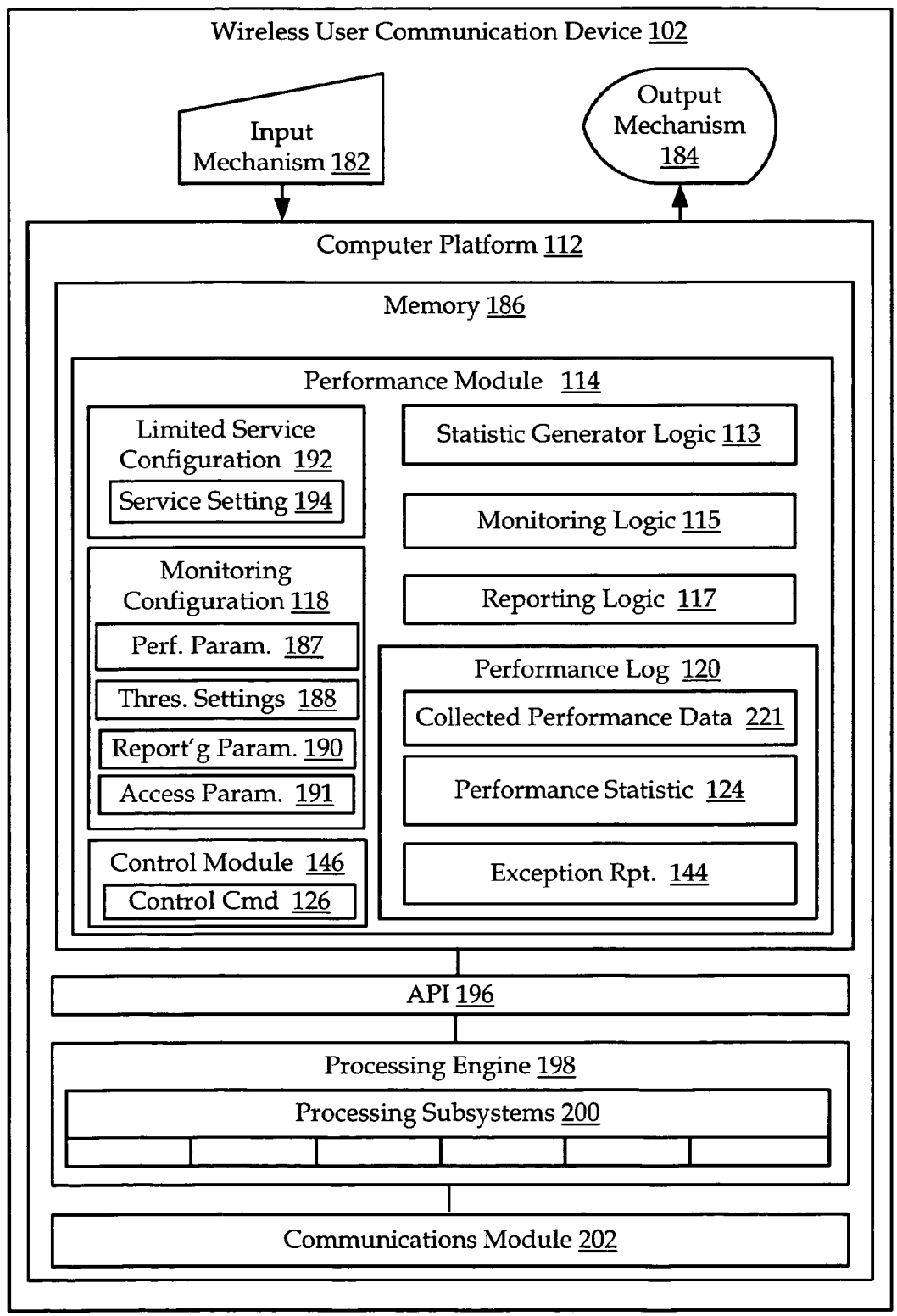
FIG. 2 is an architecture diagram of one aspect of the wireless device of FIG. 1.

Referring to FIG. 2, wireless device 102 may include computer platform 112 operable to receive and execute software applications and configurations, e.g. performance module 114 and performance monitoring configuration 118, and transmit both exception reports and scheduled reports across wireless network 110.

Wireless device 102 may include any type of computerized, wireless device, such as cellular telephone 102, personal digital assistant, two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 110, such as remote sensors, diagnostic tools, and data relays.

Wireless device 102 may also include input mechanism 182 and output mechanism 184 interconnected to computer platform 112. Input mechanism 182 is operable to generate an input into wireless device 102, and may include a mechanism such as a key or keyboard, a mouse, a touch-screen display, and a voice recognition module. Output mechanism 184, may include a display, an audio speaker, and a haptic feedback mechanism, for example, for relaying information to the user of the wireless device 102.

Computer platform 112 may also include a memory 186, which may comprise volatile and nonvolatile memory such as read-only and/or random-access memory (RAM and ROM), EPROM, EEPROM, flash cards, or any memory common to computer platforms. Further, memory 186 may include one or more flash memory cells, or may be any secondary or tertiary storage device, such as magnetic media, optical media, tape, or soft or hard disk. Additionally, memory 186 may be operable to store collected performance data.

Further, computer platform 112 may include a processing engine 198, which may be an application-specific integrated circuit (ASIC), or other chipset, processor, logic circuit, or other data processing device. Processing engine 198 is operable to execute an application programming interface (API) layer 196 that may interface with any resident programs, such as performance module 114, stored in memory 186. In one aspect, API 196 is a runtime environment executing on the respective wireless device. One such runtime environment is BINARY RUNTIME ENVIRONMENT FOR WIRELESS® (BREW®) software developed by Qualcomm, Inc., of San Diego, Calif. Other runtime environments may be utilized that, for example, operate to control the execution of applications on wireless computing devices.

Processing engine 198 includes various processing subsystems 200 embodied in hardware, software, firmware, executable instructions, data, and combinations thereof, that enable the functionality of wireless device 102 and the operability of the wireless device on wireless network 110. For example, processing subsystems 200 may allow for initiating and maintaining communications, and exchanging data, with other networked devices. In one aspect, such as in a cellular telephone, processing engine 198 may include one or a combination of processing subsystems 200, such as: sound, non-volatile memory, file system, transmit, receive, searcher, layer 1, layer 2, layer 3, main control, remote procedure, handset, power management, diagnostic, digital signal processor, vocoder, messaging, call manager, BLUETOOTH® system, BLUETOOTH® LPOS, position determination, position engine, user interface (UI), sleep, limited services, security, authentication, subscriber identity module (SIM) and universal SIM (USIM), voice services, graphics, universal serial bus (USB), multimedia such as Motion Picture Experts Group (MPEG) standard multimedia, General Packet Radio Service (GPRS) standard multimedia, etc.

For the disclosed aspects, processing subsystems 200 may include any subsystem components that interact with applications executing on computer platform 112. For example, processing subsystems 200 may include any subsystem components that receive data reads and data writes from API 196 on behalf of the resident performance module 114. Further, any performance data within the API and within any processing subsystems may be monitored and/or collected by performance module 114 and stored as collected performance data 221 in performance log 120 within memory 186.

In some aspects relating to connection quality, for example, in Code Division Multiple Access (CDMA) systems, parameters relating to call drops, call successes, access attempts, access failures and service degradations may be retrieved from a combination of CDMA events and "Over The Air" (OTA) messages, such as may be retrieved from the wireless device processing subsystems. For example, relevant CDMA events may include, but are not limited to, timer values, counter values, and number of access probe attempts, etc. Further, for example, relevant CDMA OTA messages may include, but are not limited to, reverse traffic channel messages and access channel messages.

In other system implementations, such as Universal Mobile Telecommunications System (UMTS), OTA messages may be utilized by performance module 114 to determine the performance statistics 124. For example, refer to U.S. patent application Ser. No. 11/078,235 entitled "Apparatus and Methods for Determining Connection Quality of a Wireless Device on a Wireless Communications Network," to Fok et al., filed Mar. 10, 2005, incorporated by reference above, for further details relating to the evaluation of sequences of messages for determining performance statistics.

Computer platform 112 may further include a communications module 202 embodied in hardware, software, executable instructions, data, and combinations thereof, operable to enable communications among the various components of the wireless device 102 and wireless network 110. Communications module 202 may comprise any component/port/interface that may include any point of entry into, and/or any point of exit from wireless device, as well as the components relating to the signal transmit and receive chains. As such, communications module 202 may include interface components for hardwired communications and for wireless communications. For example, communications module 202 is operable to receive monitoring configuration 118 generated by performance manager control module 130 (FIG. 1), as well as being operable to transmit to performance manager server 104 (FIG. 1) the performance statistics 124 and any other collected performance data 221 generated and/or collected by performance module 114.

Computer platform 112 further includes performance module 114, which may comprise one or any combination of hardware, software, firmware, data and executable instructions. The performance module 114 may be loaded into memory 186 by various mechanisms including, but not limited to, being downloaded from any computer device connected to wireless network 110, and being statically loaded on the wireless device 102 prior to delivery to the end user, such as at the time of manufacture. Computer devices from which performance module 114 may be downloaded include performance manager server 104 and customer care workstation 106.

The performance module 114 may include one or a plurality of mechanisms for effecting the functionality described herein. In some aspects, for example, performance module 114 includes statistic generator logic 113 operable to generate one or more predetermined performance statistics 124. For example, statistic generator logic 113 may generate performance statistics 124 associated with one or performance parameters 187 identified by monitoring configuration 118, and store the performance statistic in performance log 120. Performance log 120 may be any type of persistent or non-persistent memory and/or data repository operable to receive and store data, such as performance statistics 124, collected performance data 221, and/or any other data. Alternately, statistic generator logic 113 may be preprogrammed to generate a predetermined plurality of performance statistics, among which one or more statistics may be monitored.

In some aspects, performance statistics 124 may be calculated based upon data within API, processing subsystems, applications, OTA messages and/or combinations of OTA messages and events retrieved through processing subsystems. In some embodiments, monitoring configuration 118 need not list every parameter relating to a performance statistic 124. Software algorithms, comprising portions of statistic generator logic 113, may be executable to calculate performance statistics 124 and may direct the storage of whatever intermediate parameters are required to monitor and calculate the configured performance statistics 124.

The performance parameter 187 of monitoring configuration 118 may include an identification of data for determining a predetermined performance statistic 124, and/or an identification of the statistic itself. Further, it should be noted that the values of the performance data stored in performance log 120 may be cumulative data over the lifetime of the device, and/or data stored over a predetermined time period, and/or data as of the last reset. Further, any data and/or statistic maintained in memory 186 by the wireless device 102 may be identified by the configuration 118, logged and forwarded to remote server 104 along with the one or more performance statistics 124.

Further, in some aspects, performance module 114 may include monitoring logic 115 operable to compare a predetermined performance statistics 124 with a corresponding predetermined threshold setting 188, which may be included in monitoring configuration 118. As discussed above, configuration 118 may include one or more performance parameters 187 and corresponding threshold settings 188 relating to at least one performance statistic 124 to be tracked. For example, monitoring logic 115 may be able to determine if performance statistic 124 meets the corresponding threshold setting 188, and to take predetermined action based on whether or not the statistic meets the setting. In some aspects, for example, monitoring logic 115 may cause the storage in performance log 120 of collected performance data 221, such as performance parameters 187, threshold settings 187, and any other data that may be associated with a given performance statistic 124, such as a state of the wireless device and/or any hardware and/or software component of the wireless device.

In another example, upon updating of performance statistics 124 by statistic generator logic 113, monitoring logic 115 may compare each updated performance statistic 124 with its associated threshold setting 188. In some aspects, based upon that comparison and/or based upon reporting parameter 190 in configuration 118 (discussed in more detail below), monitoring logic 115 may generate an exception report 144 identifying a performance statistic meeting its configured threshold, and/or any or all performance statistics, thresholds and/or performance-related data. Furthermore, in some embodiments, upon meeting a threshold, the uploaded exception report information may include, but is not limited to: wireless device identifying information; the exception data, e.g. an identifier of the connection quality statistic, such as a name and/or a code and the value of the statistic; and the date and time of the upload, which may be collected from a wireless device subsystem.

Additionally, in some aspects, performance module 114 may include reporting logic 117 for communicating the exception report 144, the performance log 120, and/or any of its components, to a predetermined address, such as to manager server 104. For example, based upon configurable, predetermined reporting parameter 190, reporting logic 117 is operable to transmit collected performance data 221, performance statistics 124 and/or a corresponding exception report 144 to the performance manager server 104 and/or another predetermined party. For example, the information contained within performance log 120 may be utilized by server 104 (FIG. 1) to generate a summary report 148 (FIG. 1) relating to wireless device performance. In another case, for example, reporting logic 117 may communicate exception report 144 to server 104 when notified by monitoring logic 115 that a given performance statistic 124 meets its corresponding performance threshold setting 188. Further, for example, based upon reporting parameter 190, predetermined information, such as collected performance data 221 and/or performance statistics 124, may be uploaded to the performance manager server 104 on a predetermined and configurable schedule or based on a predetermined event. A predetermined event may comprise meeting one or any combination of predetermined thresholds, receiving a request from an authorized party, establishment of a communications connection, etc. Further, in some aspects, after a transmission, performance module 114 may reset log 120 and statistics 124.

Further, monitoring configuration 118 may include an access parameter 191, which may determine whom to allow access to memory 186, for example, in order to retrieve performance statistics 124. Authorized users may include a specific remote device, such as performance manager server 104 and customer care workstation 106.

In some aspects, selected statistics and/or performance logs may be transmitted over an open communication connection between the wireless device 102 and the wireless network 110, "piggybacking" on an ongoing voice or data call across an open connection. Alternatively, in a cellular network configuration, performance statistics 124 may be transmitted to performance manager 104 through short message service (SMS) and/or via a Hypertext Transfer Protocol (HTTP) message. Furthermore, another aspect of the performance manager server 104 may "pull" the selected statistics 124 from the wireless device 102 across the network 110 on a scheduled or ad hoc basis.

Performance module 114 further includes wireless device control module 146 operable to receive and carry out a control command 126. Upon receipt of control command 126, the monitoring logic 115 and/or wireless device control module 146 are/is operable to parse the command and determine what action is requested. For example, control command 126 may be any command comprising an activity to be performed by the wireless device, such as launching performance module 114, updating and/or executing monitoring configuration 118, and/or performing some remotely-directed activity. Device control module 146 is discussed below in more detail in reference to FIG. 4.

Further, for example, upon receiving and/or executing control command 126, monitoring logic 115 and/or wireless device control module 122 may respond to server 104 with a request to verify the control command, as is discussed below, and/or with an acknowledgement message. For example, such an acknowledgment message may be transmitted in response to a bootstrap command to download configuration 118.

In some aspects, data transmission between the wireless device 102 and remote devices, e.g., remote server 104 and customer care workstation 106, may be transmitted over a limited-access communications channel through wireless network 110. The communication channel may be set up based upon a limited service configuration 192 and may be used for transmitting statistics 124 to remote server 104 or for downloading at least portions of performance module 114, including monitoring configuration 118, to wireless device 102. In some aspects, the limited-access communications channel may not be available to the end user. Further, the limited-access communications channel may be configured based on limited service setting 194 that identifies allowable types of communications, and the associated communication channels that may be utilized. Limited service configuration 192 may be downloaded over wireless network 110, may be locally transferred to wireless device 102, such as through a serial connection, or may be preloaded on the wireless device 102.

Referring back to FIG. 1, performance manager server 104 (or plurality of servers) may, via performance manager control module 130 in combination with communications module 152, send software agents or applications, such as any portion of performance module 114 including monitoring configuration 118, to wireless device 102 across wireless network 110, such that the wireless device 102 returns information from its resident applications and subsystems 200. Performance manager server 104 may comprise at least one of any type of server, personal computer, mini computer, mainframe computer, or any computing device either special purpose or general computing device further comprising processor assembly 150. Further, there can be separate servers or computer devices associated with performance manager server 104 that work in concert to provide data in usable formats to parties, and/or to provide a separate layer of control in the data flow between the wireless devices 102 and performance manager server 104.

Performance manager server 104 may comprise performance manager control module 130 that may further include software, hardware, data, and generally any executable instructions operable to manage the collection and reporting of statistics 124 collected from wireless device 102. Performance manager control module 130 may further include information repository 136 operable to receive and store logs 120 and/or statistics 124 and/or collected performance data 221 received from wireless device 102. Information repository 136 may include any type of memory or storage device.

As mentioned above, performance manager control module 130 is operable, in combination with communications module 152, to receive uploaded statistics 124 as well as other performance-related data 221, logs 120, etc., and to generate performance reports which may be made available to predetermined parties, such as customer service personnel. In some aspects, performance manager control module 130 may comprise report generator 142 operable to generate and transmit an exception report 144 to a customer care workstation 106 when a predetermined threshold is met. Exception report 144 may include the exception data, i.e. the respective performance statistics and associated data received from wireless device 102. In one embodiment, such an exception report 144 may include but is not limited to: wireless device identifying information; a performance statistics identifier that may comprise a description and/or code; a value representing the performance statistic and/or the threshold; and the date and time of the generation of the exception report 144 and/or of the occurrence of the met threshold. Furthermore, report 144 may be transmitted to any predetermined party, such as by electronic media, for example, facsimile and e-mail. In other aspects, threshold exceptions and accompanying data may be viewable online by a predetermined authorized user 108 having access to remote server 104.

In addition to generating threshold exception report 144, report generator 142 is operable to generate a summary report 148 based upon performance statistics 124 received from wireless devices 102 on a scheduled basis. Summary report 148 may be used to monitor, on a regular basis, the general level of performance of one or any combination of wireless devices. For example, in some aspects, customer service support for wireless devices may be distributed among a number of customer service representatives, who may be authorized users 108. In such a scenario, report generator 142 may be operable to generate a report 148 summarizing performance statistics for a predetermined subset of wireless devices, such as for high average revenue per unit (ARPU) customers, and/or by carrier to determine conformance to service level agreements (SLAs). Report 148 may be generated summarizing performance statistics for the wireless devices assigned to each authorized user 108.

As with exception report 144, summary report 148 may be viewable online to an authorized user 108 and/or may be sent to any predetermined party, such as via an e-mail or facsimile. For example, report 148 may be transmitted via communications module 152 to a device, such as customer care workstation 106. Based upon the output of report generator 142, an authorized user 108 may take appropriate action to resolve any issues identified.

Further, performance manager control module 130 may include configuration generator module 140 which is executable to generate configuration 118 under control of an authorized user, such as authorized user 108, and as previously disclosed, download all or a portion of performance module 114, including configuration 118, to wireless device 102. Additionally, performance manager control module 130 may "pull" selected performance statistics 124 based on commands from an authorized user 108, upon a request from performance manager control logic 134, or the performance statistics 124 may be "pushed" from the wireless device 102.

Figure 3:
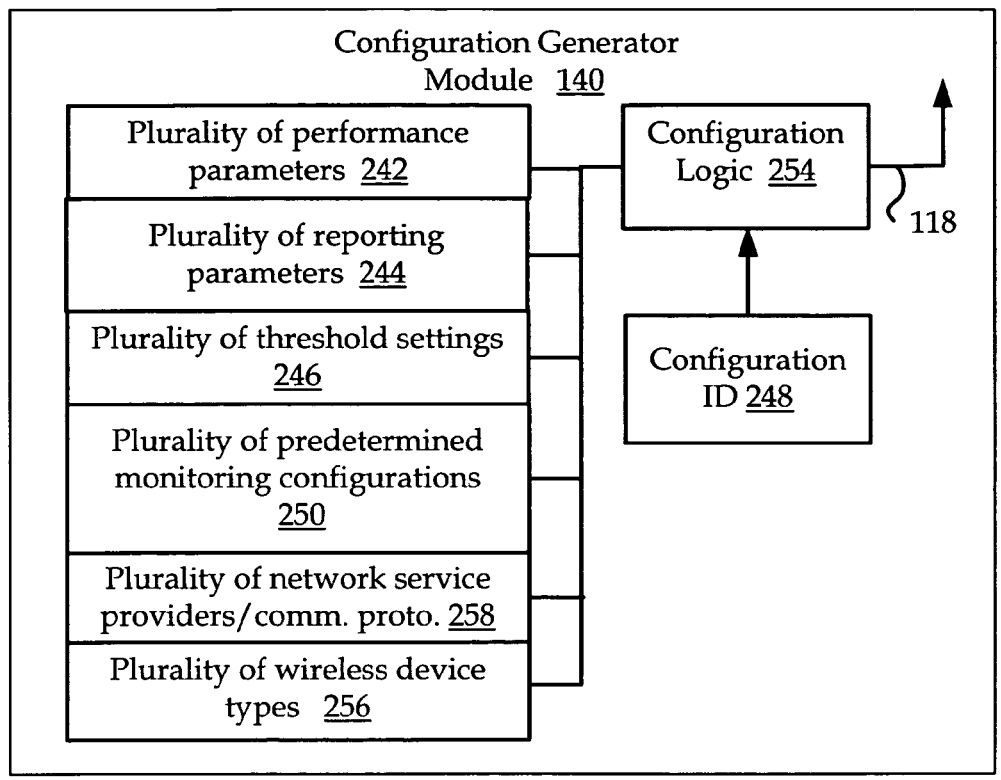
FIG. 3 is a schematic diagram of one aspect of an configuration generator module associated with the performance manager control module of FIG. 1.

Referring to FIG. 3, one embodiment of a configuration generator module 140 may include hardware, software, firmware, executable instructions, data, and/or any other associated logic that allows the configuration generator module 140 to generate configuration 118. In some aspects, configuration generator module 140 may be operable to execute configuration logic 254 that assembles the various components of a given configuration 118 based on selections from a number of parameters. For example, different network providers may utilize different mobile technologies, e.g. CDMA and UMTS. Accordingly, parameters that make up configuration 118 may vary depending on the type/make/model of the wireless device and/or the network service provider/communications protocol. As such, configuration logic 254 may provide a user with the ability to select from a menu of a plurality of wireless device types/models 256 and a plurality of network service providers/protocols 258 in order to generate an appropriate menu from which to select the parameters of configuration 118.

In some aspects, configuration generator module 140 may include a plurality of performance parameters 242 from which one or more configuration performance parameters 187 (FIG. 2) are selected. The plurality of performance parameters 242 enables an operator of the system, such as authorized user 108, to configure the performance module 114 to monitor and report upon any predetermined number and/or type of parameter that may be related to and/or associated with wireless device network-related and/or network independent performance. The plurality of performance parameters 187 each relate to one or more performance statistics 124.

Furthermore, in some aspects, configuration generator module 140 may include a plurality of threshold settings 246 from which one or more configuration threshold settings 188 (FIG. 2) are selected. As noted above, the threshold setting may correspond to a predetermined performance parameter and/or statistic, and may include one or more threshold conditions and one or more corresponding threshold values. The threshold value may be a value, or may correspond to a given event. The threshold settings may be correlated to a corresponding performance parameter and/or performance statistic.

Further, in some aspects, configuration generator module 140 may include a plurality of reporting parameters 244 from which one or more configuration reporting parameters 190 (FIG. 2) are selected. Each of the plurality of reporting parameters 244 may determine at when the corresponding collected statistics may be uploaded to remote server 104, including, but not limited to, uploading upon the occurrence of a scheduled event, at a predetermined time, at a predetermined interval, and upon receiving a command by a remote device such as by remote server 104 and customer care workstation 106.

Furthermore, rather than selecting the various parameters individually, configuration logic 254 may provide the user with the ability to select from a menu of a plurality of predetermined configurations 250, which include predetermined groupings of the above-noted parameters that comprise authorization configuration 118.

Further, as noted above, in some aspects, the selected one of the plurality of wireless device types/models 256 and the selected one of the plurality of network service providers/communication protocols 258 may be correlated to a given one of a plurality of performance statistic 242. For example, certain statistics may be unavailable, or may not be relevant, on devices or networks based on one protocol or standard, but may be available on other devices or networks using different protocols or standards. Accordingly, configuration logic 254 may be able to determine which monitoring capabilities the wireless device 102 should have installed based on the associated device type, network carrier and/or communication protocol, and thus may generate monitoring configuration 118 that includes the appropriate set of corresponding parameters.

Once the specific parameters of a given configuration 118 are determined, then configuration logic 254 may assign unique configuration ID 248 to the given configuration, and may store this configuration in a library for later recall, such as among plurality of predetermined monitoring configurations 250. Further, configuration logic 254, and/or another component of performance manager control module 130, may be operable to transmit configuration 118 to one or more wireless devices 102 to initiate the monitoring and tallying of statistics on that device.

Figure 4:
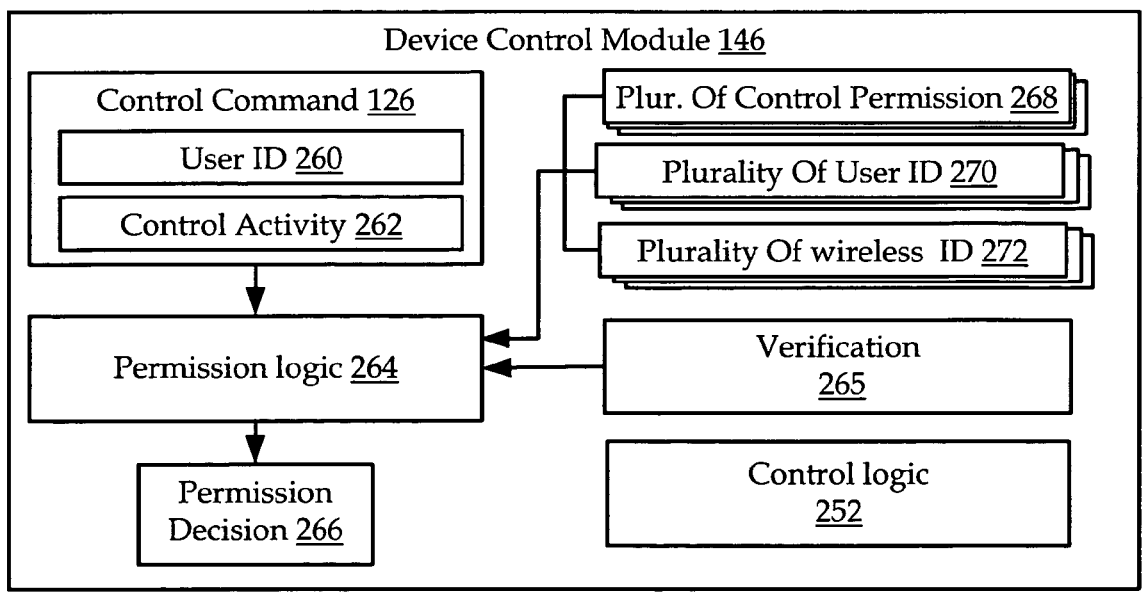
FIG. 4 is a schematic diagram of one aspect of a device control module associated with the performance manager control module of FIG. 1.

Referring to FIG. 4, the performance manager control module 130 and/or the wireless device 102 may comprise device control module 146 operable, by execution of control logic 252, to either execute control command 126 on wireless device 102 or transmit control command 126 to wireless device 102. In some aspects, as noted above, the wireless device 102 may include a version of device control module 146 that simply carries out control commands 126, while in other aspects the wireless device includes a fully functional version, as described herein.

In some aspects, for example, control command 126 may contain user identification ("ID") 260 and control activity 262. User ID 260 may be some manner of identifying the originator of control command 126, i.e. authorized user 108. For example, user ID 260 may be a name, a number, a digital signature, a hash, or any other type of data or value that may be associated with a party. Further, user ID 260 may not be explicitly contained in the control command 126, but rather may be derived from the origin of control command 126. Additionally, control activity 262 may be an operation to be performed on wireless device 102 by performance module 114 through executing control command 126. As mentioned above, these operations may include downloading at least portions of performance module 114, and initiating the uploading and resetting of statistics 124.

Before executing or forwarding the control command 126, device control module 146 may execute permission logic 264 to verify the intent of the sender of the command to perform the action, as well as to determine the authority of the sender (via user ID 260) issuing control command 126. For example, verification 265 may be requested by wireless device 102 prior to downloading configuration 118 from remote server 104.

To determine whether a user has authorization to issue control command 126, permission logic 264 may parse user ID 260 and control activity 262 from control command 126 and utilize a database of a plurality of user IDs 270 correlated with a plurality of control permissions 268, and correlated with a plurality of wireless device identifications (IDs) 272. Thus, based upon whether verification 265 is received and/or whether proper authorization is found, device control module 146 generates a permission decision 266, which determines whether or not to execute generated control command 126.

Control permissions 268 may identify one or more authorized control activities 262 for a given user ID 260 and/or wireless device ID 272. For instance, certain users may be restricted to certain control activities, or to being able to control certain wireless devices. Similarly, certain wireless devices may be restricted in what control activities they are allowed to perform. The plurality of user IDs 270, the plurality of control permissions 268 and the plurality of wireless device IDs 272 may be correlated in any manner. For example, control command 126 may contain a user ID 260 of authorized user 108, and a control activity 262 of "upload current statistics" for a particular one of the plurality of wireless device IDs 272. Permission logic 264 searches the database of control permissions 268 and user IDs 270 to determine if the user 108 has the permission to disable executable instructions on the given wireless device 102.

Additionally, it should be noted that the actual location of the disclosed components of the performance manager control module 130 is non-limiting and may be physically located on a server and/or distributed among a plurality of network devices.

In summary, in some aspects of system 100, authorized user 108 operating customer care workstation 106 may proactively support customers, i.e. wireless devices, based upon exception report 144 and/or summary report 148 generated by remote server 104. Reports 144, 148 may be electronically transmitted, such as by e-mail, to the customer care workstation 106, or may be made available for viewing on the remote server 104 by an authorized user without requiring transmitting the reports to the customer care workstation 106.

In other aspects of system 100, authorized user 108 may be enabled to download performance module 114, or parts thereof, to one or multiple wireless devices 102 directly from the workstation 106. In other aspects, user workstation 106 may be a slave to remote server 104, requiring server 104 to validate the operator 106 and to manage connectivity to the wireless devices 102.

Figure 5:
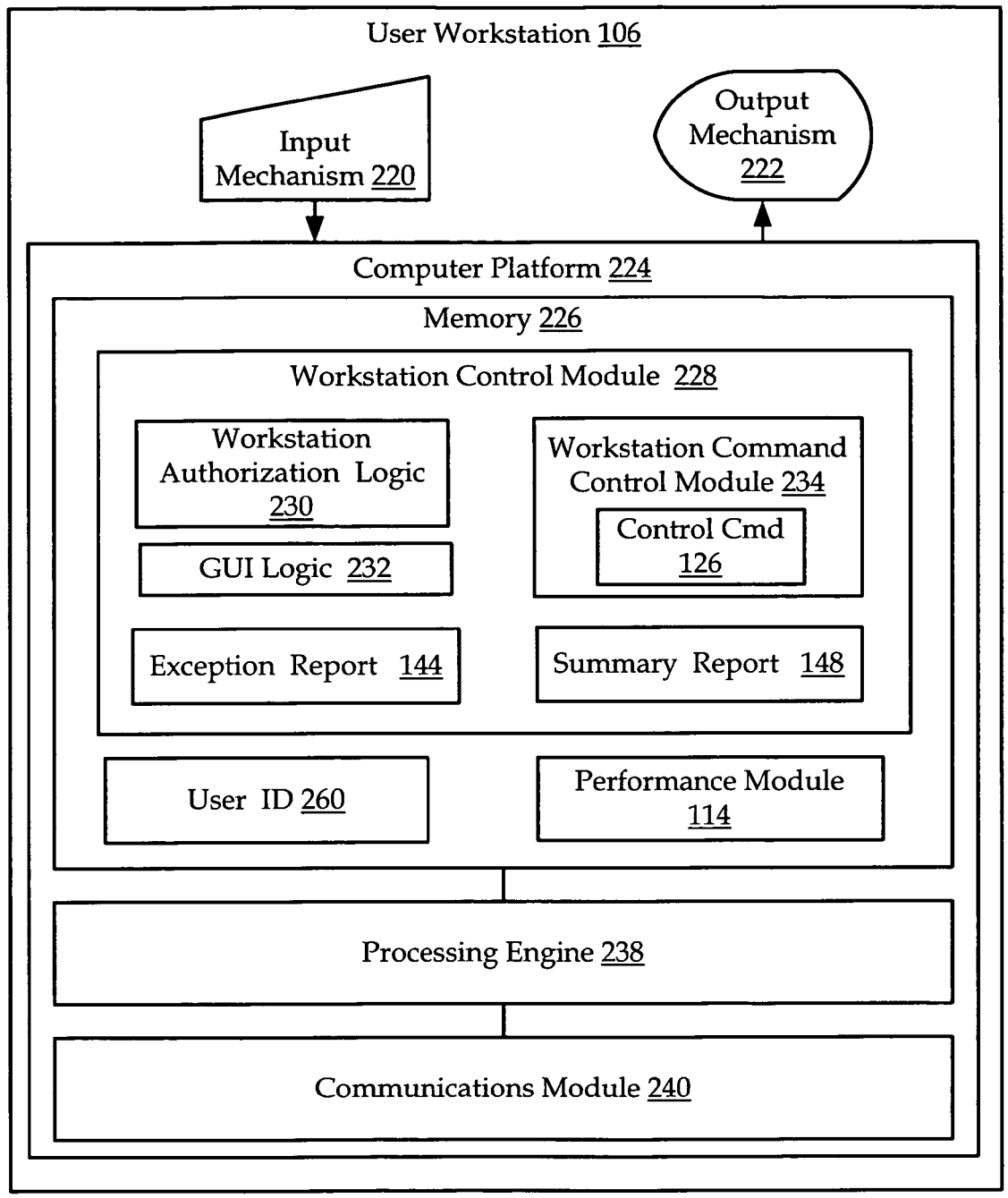
FIG. 5 is a schematic diagram of one aspect of a cellular telephone network aspect of FIG. 1.

Referring to FIG. 5, user workstation 106 may comprise at least one of any type of server, personal computer, mini computer, mainframe computer, terminal, or any computing device either special purpose or general computing device operable to communicate with both wireless device 102 and remote server 104. In one aspect, user workstation 106 may comprise a processing engine 238, and a communications module 240 operable to transmit and receive messages and data between the workstation 106, the remote server 104, wireless device 102, as well as any network component on wireless network 110. In other aspects, customer care workstation 106, may reside on any network device of wireless network 110, such as on performance manager server 104, another server connected to the network, or even on a wireless device 102.

User workstation 106 may comprise an input mechanism 220, and an output mechanism 222 interconnected to computer platform 224. The input mechanism 220 and the output mechanism 222 may be similar to their respective counterparts 182, 184 on wireless device 102 and permits a authorized user 108 to interface with the user workstation 106 and, via the workstation, with the performance manager server 104 and ultimately with the wireless device 102.

The workstation computer platform 224 may further comprise a memory 226 for storing applications and data files including a workstation control module 228 executed by processing engine 238. Because the number of workstations 106 and the number of field engineers 108 are non-limiting, user ID 260 may be entered into memory 226 by authorized user 108, and may be operable to identify the user of a particular workstation 106 to network components including remote server 104 and wireless device 102.

The workstation control module 228 may further include authorization logic 230 operable in conjunction with Graphic User Interface (GUI) logic 232, input mechanism 220, and output mechanism 222, to guide the authorized user 108 through any analysis and command activity selection and transmission. The GUI logic 232 may control, for example, e-mail communication, report presentation, as well providing a menu by which workstation command control module 234 may select and transmit any control command 126 to performance manager control module 130 and wireless device 102.

Wireless network 110 includes any communications network operable, at least in part, for enabling wireless communications between wireless device 102 and any device connected to wireless network 110. Further, wireless network 110 may include all network components, and all connected devices that form the network. For example, wireless network 110 may include at least one, or any combination, of: a cellular telephone network (as embodied in FIG. 4); a multicast network such as a Forward Link Only (FLO) network, such as the MEDIAFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association ("IrDA")-based network; a short-range wireless network; a BLUETOOTH® technology network; a ZIG-BEE® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and a land mobile radio network.

Suitable examples of telephone networks include at least one, or any combination, of analog and digital networks/technologies, such as: code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("1X") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

Figure 6:
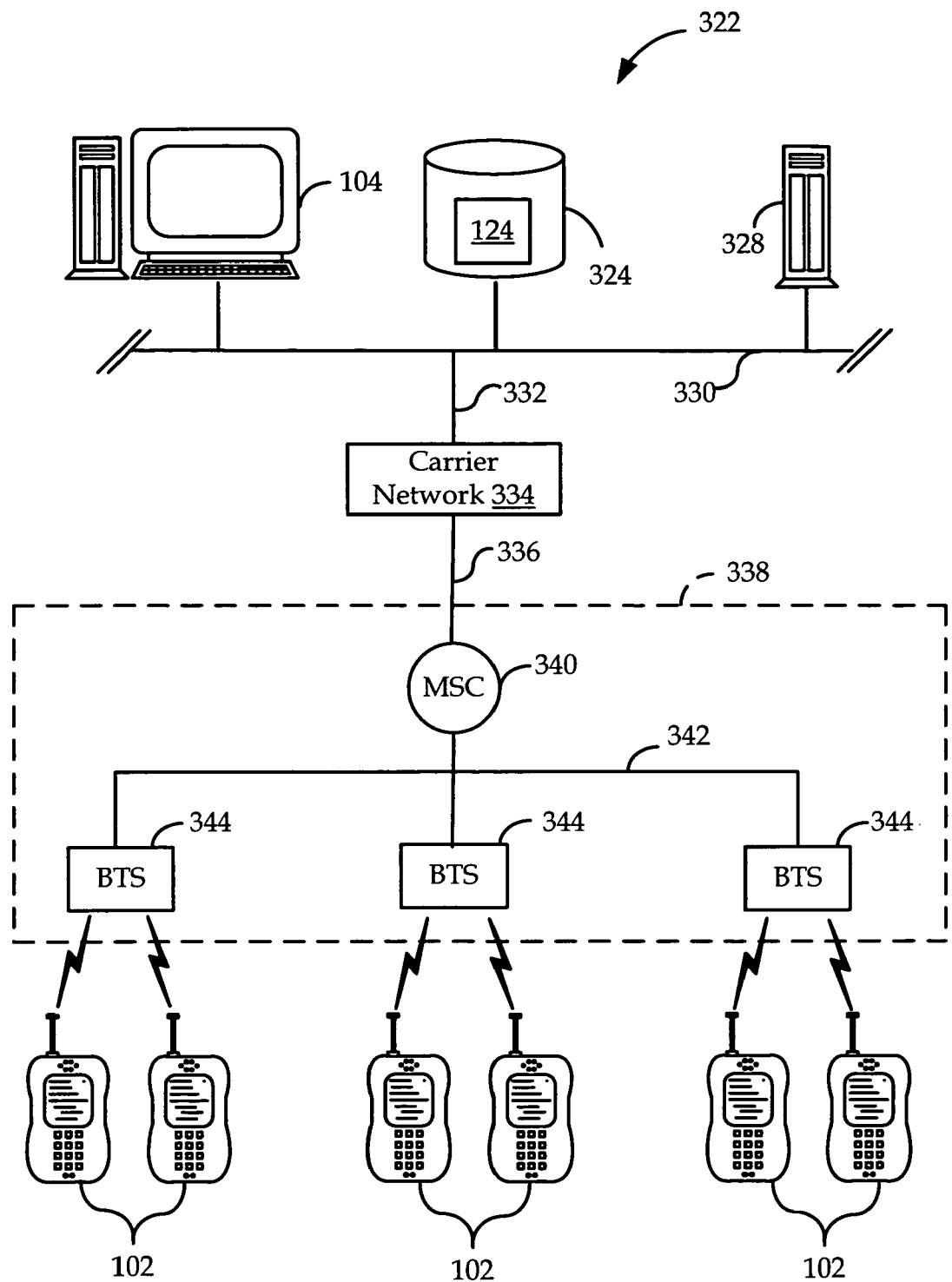
FIG. 6 is a schematic diagram of one aspect of a cellular telephone network aspect of FIG. 1.

Referring to FIG. 6, an aspect of a cellular wireless system 322 comprises at least one wireless device 102 and a cellular telephone wireless network 338 connected to a wired network 330 via a carrier network 334. Cellular telephone system 322 is merely exemplary and may include any system whereby remote modules, such as wireless devices 102 communicate packets including voice and data over-the-air between and among each other and/or between and among components of wireless network 338, including, without limitation, wireless network carriers and/or servers.

According to system 322, performance manager server 104 may communicate over a wired network 330 (e.g. a local area network, LAN) with data repository 324 for storing statistics 124, gathered from wireless devices 102. Further, a data management server 328 may be in communication with performance manager server 104 to provide post-processing capabilities, data flow control, etc. Performance manager server 104, data repository 324 and data management server 328 may be present on the cellular telephone system 322 along with any other network components needed to provide cellular telecommunication services.

Performance manager server 104, and/or data management server 328 may communicate with carrier network 334 through data link 332, such as the Internet, a secure LAN, WAN, or other network. Carrier network 334 controls messages (generally being data packets) sent to a mobile switching center ("MSC") 340. Further, carrier network 334 communicates with MSC 340 by a network 336, such as the Internet, and/or POTS ("plain old telephone service"). Typically, in network 336, a network or Internet portion transfers data, and the POTS portion transfers voice information. MSC 340 may be connected to multiple base stations ("BTS") 344 by another network 342, such as a data network and/or Internet portion for data transfer and a POTS portion for voice information. BTS 344 ultimately broadcasts messages wirelessly to the wireless devices, such as wireless device 102, by short messaging service ("SMS"), or other over-the-air methods.

Figure 7:
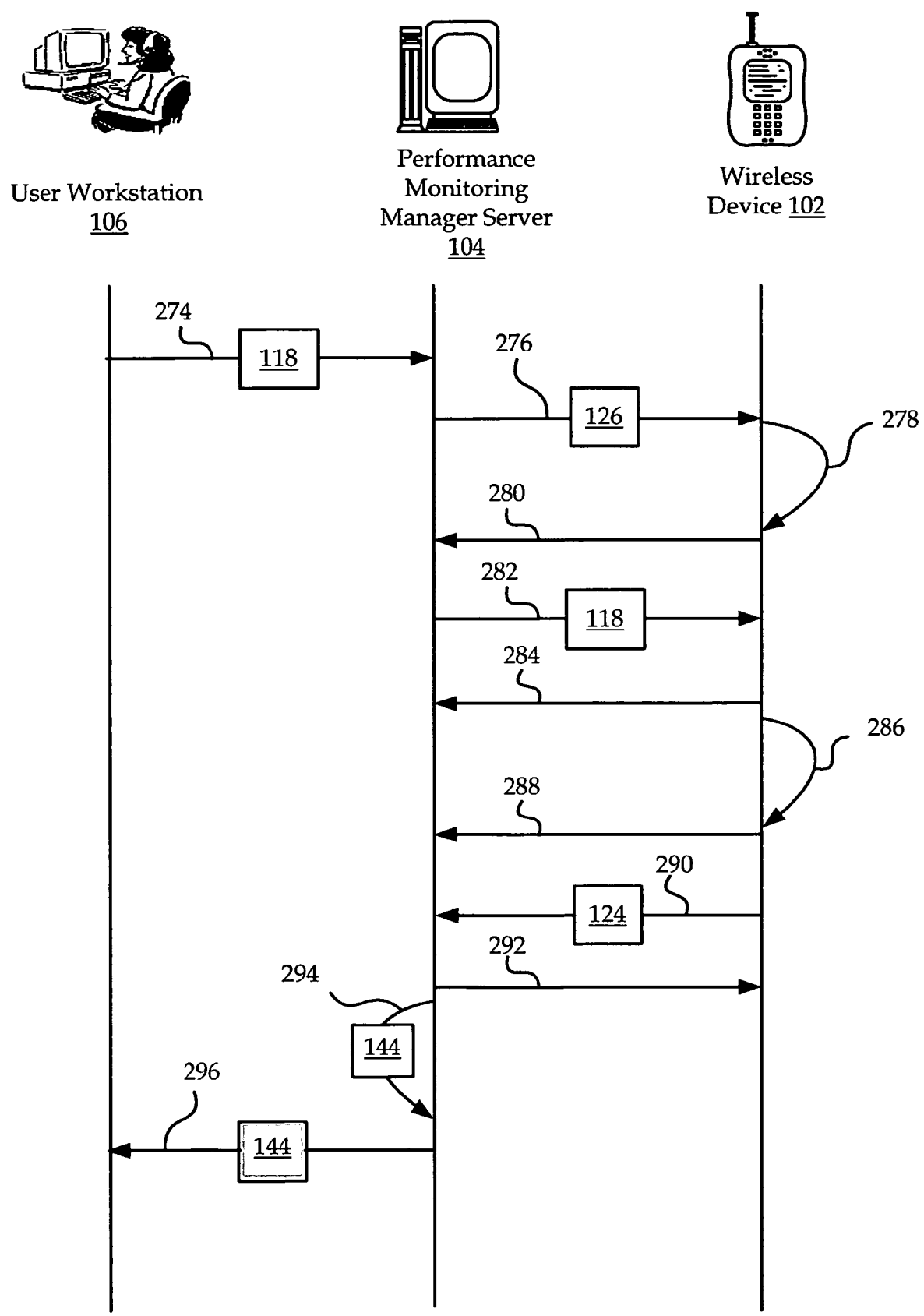
FIG. 7 is a message flow diagram associated with one aspect of the operation of the system of FIG. 1.

Referring to FIG. 7, a method for providing exception data for performance statistics accumulated for a wireless device may initiate with an authorized user 108 configuring, at step 274, at least a portion of performance module 114, e.g. configuration 118, for subsequent downloading to a single or a selection of wireless devices 102.

In some aspects, the performance module 114 initially may be absent from the wireless device 102 and may be "pushed" by a performance manager control module 130 to the wireless device 102 or "pulled" from performance manager control module 130 by the wireless device 102 across a wireless network 110 to ensure that the wireless device 102 has the latest software version. In another alternative, the pushing or pulling of the performance module 114 to the wireless device 102 may be configurable in any manner, for example: being initiated by a predetermined event.

In other aspects, although a given wireless device 102 may already have performance module 114 resident in memory, it may not, however, have an up-to-date monitoring configuration 118. In some aspects, monitoring configuration 118 may be generated by server 104. For example, performance manager control module 130 on server 104 may execute configuration generator module 140 to generate monitoring configuration 118. Further, performance manager control module 130 may execute communications module 152 to forward monitoring configuration 118 to one or to multiple wireless devices 102 under direction of the authorized user 108.

Configuration generator module 140 may utilize configuration logic 254 to determine and/or customize the various parameters comprising monitoring configuration 118, and may vary depending on the type/make/model of the wireless device 102, the actual network service provider, and the statistic to be monitored and tallied.

Upon command of authorized user 108, performance manager control logic 134 may, at step 276, send a control command 126, such as a bootstrap command, to launch the performance module 114 resident in memory 186 of a selected wireless device. The bootstrap command may be sent over a limited communications channel, and/or may be sent via SMS or automated call back (ACB) protocols, or sent using other over-the-air methods.

At step 278, the wireless device control module 122 may parse the bootstrap command, and optionally verify and/or authenticate the received message prior to execution. For example, wireless device control module 122 may execute the command immediately, or may query the source of control command 126 to verify the control command before executing it. In another example, the device control module 122 may utilize permission logic 264 to check user ID 260 and/or control activity 262 associated with control command 126 against a permissions database to determine an authorization for the control command, thereby formulating permission decision 266. In yet another alternative, device control module 122 may request remote server 104 to operate device control module 146 to verify and/or authorize control command 126. In such as case, based upon successful verification or authentication of the bootstrap command, at step 280, the performance module 114 may establish a connection, such as an HTTP connection, with remote server 104 over wireless network 110.

At step 282, the performance module 114 may obtain monitoring configuration 118, for example, by initiating a download of the configuration from the remote server 104. In another aspect, configuration 118 may be obtained through forwarding through a static or serial connection to wireless device 102, or may be preloaded on wireless device 102 during the manufacture of the wireless device 102.

As previously disclosed, configuration 118 may comprise: performance parameters 187 operable to control which performance statistics 124 to monitor and calculate; threshold settings 188 that define threshold conditions and values corresponding to monitored parameters; reporting parameters 190 operable to control at what times performance statistics 124 are uploaded to remote server 104; and access parameters 191 (FIG. 2) which define access permissions to wireless device 102 provided to remote devices. After a successful download of monitoring configuration 118, an acknowledgment may be transmitted to the remote server 104 at step 284 to indicate successful transmission of the configuration 118.

At step 286, the performance module 114 may run as a background process, collecting performance data 221 and generating performance statistics 124 based upon the parsed parameters of configuration 118. Performance module 114 may compare generated performance statistics 124 to corresponding, predetermined threshold settings 188 in order to monitor the performance of the wireless device.

Upon at least one of the performance statistics 124 meeting a corresponding one of the configured thresholds 188, performance module 114 may, at step 288, establish, via communications module 202 and/or limited service configuration 192, an upload mechanism with remote server 104. Such an uploading mechanism may include a HTTP, HTTPS, an FTP, or other data transfer protocol. At step 290, reporting logic 117 may communicate a notification, such as exception report 114, including statistics 124, configuration 118, collected performance data 221 and any other configurable data from the wireless device 102, and forward the notification to a predetermined address, such as to the remote server 104. Reporting logic 117, in combination with communications module 202, may forward the notification using any communication means or connection to which the wireless device 102 has access. In one embodiment, such an upload may include, but is not limited to: wireless device identifying information, e.g. wireless ID 272; a performance statistics identifier that may comprise a description and/or code; a value representing the performance statistic and/or the threshold; and the date and time of the generation of the exception report 144 and/or of the occurrence of the met threshold.

At step 292, the remote server 104 may transmit an acknowledgment message to the wireless device 102 indicating successful upload of the statistics 124, collected performance data 221, and/or exception report 144, and their storage in information repository 136. For example, in some aspects, communications module 152 is operable to receive the performance-related information from the wireless device, and performance manager control module 130 is operable to direct the storage of this information in information repository 136.

At step 294, report generator 142 may access the received performance statistics 124, collected performance data 221 and/or exception report 144, and, in some aspects, may supplement and/or generate exception report 144. Performance manager control module 130 may, at step 296, then direct the exception report 144 be sent to a predetermined party, such as a customer service representative. Upon receipt of report 144, authorized user 108 may further analyze the data and take appropriate action. Alternatively, the exception report 144 may remain on the remote server 104 where it may be made viewable by an authorized user 108 logged into the remote server 104.

Figure 8:
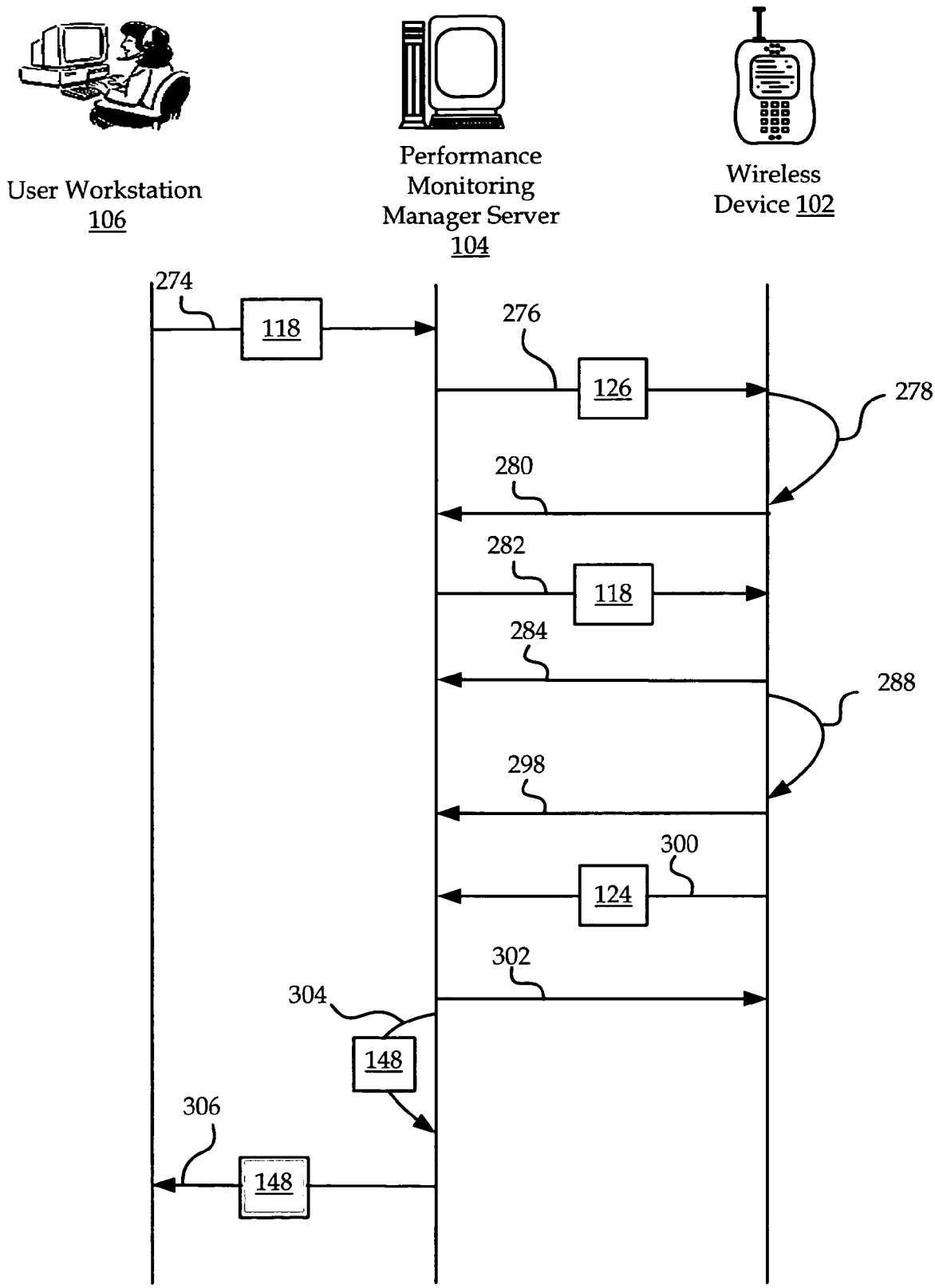
FIG. 8 is another message flow diagram associated with another aspect of the operation of the system of FIG. 1.

Similar to the exception reporting method of FIG. 7, FIG. 8 illustrates another aspect of system 100 in which the wireless device 102 may upload the statistics 124 to remote server 104 based upon a configurable schedule. For example, this aspect may be utilized to monitor one or more predefined wireless devices and/or performance parameters associated with a wireless device. Upon receipt of these scheduled uploads, the remote server 104 is operable to generate a summary report 148 of monitored performance statistics 124 so as to enable customer service representatives, e.g., authorized users 108, to provide proactive customer support.

Specifically, the steps (274, 276, 278, and 280) are similar to that of FIG. 7. However, the configuration 118 received at step 282 may comprise reporting parameters 190 that, when parsed by wireless device control module 122, are operable, at step 298, to cause monitoring logic 114 to establish at a predetermined time, e.g. monthly, an upload mechanism with remote server 104. Such an uploading mechanism may include a HTTP, HTTPS, an FTP, or other data transfer protocol and may, at step 300, upload all performance statistics 124, collected performance data 221, configuration 118, and any other predetermined data from the wireless device 102 to the remote server 104 using any communication means or connection to which the wireless device 102 has access. Similar to the method aspect of FIG. 7, such an upload may include, but is not limited to: wireless device identifying information, e.g. wireless ID 272; a performance statistics identifier that may comprise a description and/or code; a value representing the performance statistic and/or the threshold; and the date and time of the generation of the exception report 144 and/or of the occurrence of the met threshold. Upon receipt of an acknowledgement (step 302) of receipt of performance statistics 124, in some aspects, the wireless device control module 122 may be operable to reset all logs 120 and statistics 124.

At step 304, the remote server 104 is operable to store the received data in information repository 136 and performance manager control module 130 is operable to execute report generator 142 to generate a performance summary report 148 available to any predetermined party, such as authorized user 108. For example, in some aspects, the summary report 148 may summarize accumulated performance statistics for at least a subset of wireless devices managed by authorized user 108.

Although performance manager control module 130 may generate report 148, module 130 and its corresponding components may be operable to present a ready view of usage data related information collected from multiple wireless devices 102 in any form, such as tables, maps, graphics views, plain text, interactive programs or web pages, or any other display or presentation of the data. For example, performance manager control module 130 may present, at step 306, report 148 and performance related information on a monitor or display device, and/or may transmit this information, such as via electronic mail, to another computer device for further analysis or review through such mechanisms as through HTTP, HTTPS, FTP, or some other data transfer protocol.

In another aspect, statistic data scheduled for uploading to remote server 104 may be received whole, or in pieces, and assembled by performance manager control module 130. In one aspect, performance manager control module 130 may receive performance statistics 124 over wireless network 110, whereas another aspect may have the performance manager control module 130 receive performance statistics 124 through a static or serial connection to the wireless device 102, or from some other computer device or storage media in communication with performance manager server 130 and wireless device 102.

Summary performance report 148 may include any form of output that represents analysis of performance statistics 124 and other information contained in the information repository 136, as well as any other associated information such as high ARPU customers, known outages, etc.

Thus, the described aspects allow a party, such as a wireless network service provider and a wireless device manufacturer, to report upon the performance of a wireless device, and based on those reports, make decisions to proactively provide customer support. For example, the monitoring may involve performance statistics such as, but not limited to, application usage, such as the number of media files played, the time spent playing the media, the types of media played. Any predetermined performance parameter may be configured for monitoring and reporting.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of monitoring performance of a wireless device on a wireless network, comprising:
receiving at a wireless device a control command to execute a performance module on the wireless device to obtain performance statistics, wherein the control command comprises a user identifier and a control activity, wherein the user identifier identifies an originator of the control command;
generating a permission decision that determines whether or not to execute the control command, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;
obtaining on the wireless device a variable monitoring configuration if the permission decision determines that the control command is executable, wherein the variable monitoring configuration comprises a performance parameter selected from a plurality of performance parameters and a threshold setting selected from a plurality of threshold settings, the performance parameter associated with a performance statistic selected from a plurality of performance statistics to be monitored, the threshold setting comprising a limit corresponding to the performance statistic;
determining the performance statistic for the wireless device based upon the monitored performance parameter;
comparing the determined performance statistic to the corresponding threshold setting;
generating a notification if the determined performance statistic meets the threshold setting; and
forwarding wireless device performance-related data to another device via a limited-access communications channel across a wireless network based on a predefined limited service configuration.

2. The method of claim 1, wherein obtaining on the wireless device a monitoring configuration comprises receiving a monitoring configuration from a remote device over the wireless network.

3. The method of claim 1, wherein obtaining on the wireless device a monitoring configuration further comprises receiving at least one reporting parameter, and further comprising forwarding the determined performance statistic to another device across a wireless network based on the reporting parameter.

4. The method of claim 1, wherein the monitoring configuration is selected from a plurality of monitoring configurations based on at least one of a type of the wireless device, an identity of a network service provider associated with the wireless device, and a type of communication protocol associated with the wireless device.

5. The method of claim 1, wherein determining the performance statistic for the wireless device further comprises determining at least one of a network-related performance statistic and a network independent performance statistic.

6. The method of claim 5, wherein determining the performance statistic for the wireless device further comprises determining at least one of a call drop-related metric, an access failure-related metric and a service degradation-related metric.

7. The method of claim 1, wherein determining the performance statistic for the wireless device further comprises retrieving at least one of over-the-air messages and wireless device call events.

8. The method of claim 1, wherein the limited-access communications channel is not available to an end user of the wireless device.

9. The method of claim 1, wherein forwarding wireless device performance-related data to another device comprises forwarding at least one of wireless device identifying information, the threshold setting, the monitoring configuration and performance statistic identifying information.

10. The method of claim 3, wherein forwarding the determined performance statistic further comprises forwarding the determined performance statistic based upon at least one of a predetermined schedule, a predetermined event, and a request by a remote device.

11. The method of claim 10, wherein the predetermined event includes the threshold setting.

12. A non-transitory machine-readable medium comprising instructions which, when executed by a machine, cause the machine to perform operations comprising:
receiving at a wireless device a control command to execute a performance module on the wireless device to obtain performance statistics, wherein the control command comprises a user identifier and a control activity, wherein the user identifier identifies an originator of the control command;
generating a permission decision that determines whether or not to execute the control command, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;
obtaining on the wireless device a variable monitoring configuration if the permission decision determines that the control command is executable, wherein the variable monitoring configuration comprises a performance parameter and a threshold setting, the performance parameter associated with a performance statistic to be monitored, the threshold setting comprising a limit corresponding to the performance statistic;
determining the performance statistic for the wireless device based upon the monitored performance parameter;
comparing the determined performance statistic to the corresponding threshold setting;

generating a notification if the performance statistic meets the threshold setting; and forwarding wireless device performance-related data to another device via a limited-access communications channel across a wireless network based on a predefined limited service configuration.

13. At least one processor configured to perform the actions of:

receiving at a wireless device a control command to execute a performance module on the wireless device to obtain performance statistics, wherein the control command comprises a user identifier and a control activity, wherein the user identifier identifies an originator of the control command;

generating a permission decision that determines whether or not to execute the control command, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;

obtaining on the wireless device a variable monitoring configuration if the permission decision determines that the control command is executable, wherein the variable monitoring configuration comprises a performance parameter and a threshold setting, the performance parameter associated with a performance statistic to be monitored, the threshold setting comprising a limit corresponding to the performance statistic;

determining the performance statistic for the wireless device based upon the monitored performance parameter;

comparing the determined performance statistic to the corresponding threshold setting;

generating a notification if the performance statistic meets the threshold setting; and forwarding wireless device performance-related data to another device via a limited-access communications channel across a wireless network based on a predefined limited service configuration.

14. A wireless device, comprising:

means for receiving at a wireless device a control command to execute a performance module on the wireless device to obtain performance statistics, wherein the control command comprises a user identifier and a control activity, wherein the user identifier identifies an originator of the control command;

means for generating a permission decision that determines whether or not to execute the control command, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;

means for obtaining on the wireless device a variable monitoring configuration if the permission decision determines that the control command is executable, wherein the variable\monitoring configuration comprises a performance parameter and a threshold setting, the performance parameter associated with a performance statistic to be monitored, the threshold setting comprising a limit corresponding to the performance statistic;

means for determining the performance statistic for the wireless device based upon the monitored performance parameter;

means for comparing the determined performance statistic to the corresponding threshold setting;

means for generating a notification if the performance statistic meets the threshold setting; and means for forwarding wireless device performance-related data to another device via a limited-access communications channel across a wireless network based on a predefined limited service configuration.

15. A wireless device, comprising:

a memory comprising a received control command to obtain performance statistics, wherein the control command comprises a user identifier and a control activity, wherein the user identifier identifies an originator of the control command;

a processor;

a device control module executable by the processor, wherein the device control module comprises permission logic and a plurality of authorized user identifiers correlated to a plurality of authorized control permissions, wherein the permission logic is executable to generate a permission decision that determines whether or not to execute the control command, wherein the permission decision is based on a comparison of the user identifier and the control activity in the control command with the plurality of authorized user identifiers correlated to the plurality of authorized control permissions, wherein each control permission identifies at least one authorized control activity permitted to an authorized user, whereby unauthorized users are prohibited to perform one or more control activities on the wireless device; and a performance module executable by the processor if the permission decision determines that the control command is executable, the performance module further comprising, wherein the performance module is further operable to establish a limited-access communications channel across a wireless network, wherein the limited-access communications channel is based on a predefined limited service configuration, and wherein the performance module is further operable to receive the monitoring configuration or transmit the performance statistic via the limited-access communications channel;

a monitoring configuration comprising a performance parameter and a predetermined threshold setting, the performance parameter associated with a performance statistic to be monitored, the predetermined threshold setting comprising a limit corresponding to the performance statistic;

monitoring logic operable to determine the performance statistic based upon the monitoring configuration; and reporting logic operable to generate a notification message when the performance statistic meets the predetermined threshold setting.

16. The device of claim 15, wherein the monitoring configuration is received by the wireless device from across the wireless network.

17. The device of claim 15, wherein the performance statistic further comprises determining at least one of an air interface statistic and a non-air interface statistic.

18. The device of claim 17, wherein the performance statistic further comprises determining at least one of a call drop-related metric, an access failure-related metric, and a service degradation-related metric.

19. The device of claim 15, wherein the performance statistic further comprises information derived from at least one of over-the-air messages and wireless device call events.

20. The device of claim 15, wherein the monitoring configuration further comprises a predetermined reporting parameter selected from a plurality of predetermined reporting parameters, wherein the performance module is further operable to transmit the performance statistic to another device based upon the predetermined reporting parameter.

21. The device of claim 20, wherein the performance module is further operable to transmit the performance statistic across a wireless network.

22. The device of claim 15, wherein the monitoring configuration further comprises an access parameter that identifies which devices may access the performance module.

23. The device of claim 15, wherein the limited-access communications channel is not available to an end user of the device.

24. The device of claim 15, wherein the control command comprises at least one of a bootstrap command and a reset command, wherein the bootstrap command is operable to initiate a download of the monitoring configuration, and wherein the reset command resets performance statistics uploaded from the wireless device.

25. A method of monitoring performance of a wireless device, comprising:
    receiving a control command to execute a performance module on a wireless device to obtain performance statistics, wherein the control command comprises a user identifier and a control activity, wherein the user identifier identifies an originator of the control command;
    generating a permission decision that determines whether or not the control command is authorized, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;
    generating a monitoring configuration executable to initiate monitoring, calculating and reporting of at least one performance statistic on the wireless device if the permission decision determines that the control command is authorized, the monitoring configuration identifying a performance parameter;
    forwarding the monitoring configuration for receipt by the wireless device;
    receiving a calculated performance statistic from the wireless device based on the monitoring configuration;
    generating a performance report based on the received performance statistic; and
    forwarding wireless device performance-related data to another device via a limited-access communications channel across a wireless network based on a predefined limited service configuration.

26. The method of claim 25, wherein generating the monitoring configuration further comprises identifying a threshold parameter corresponding to the performance statistic, wherein generating a performance report further comprises generating a performance report when the calculated performance statistic received from the wireless device meets the threshold parameter.

27. The method of claim 25, wherein generating a performance report further includes generating a summary report of the calculated performance statistic based on a predetermined schedule.

28. The method of claim 25, wherein generating a monitoring configuration includes generating a monitoring configuration for monitoring at least one of a network performance-related statistic and a network independent device performance statistic.

29. The method of claim 28, wherein generating a monitoring configuration includes generating a monitoring configuration for monitoring at least one of a call drop-related metric, an access failure-related metric, and a service degradation-related metric.

30. The method of claim 25, further comprising transmitting at least a portion of the performance report to another computer device.

31. The method of claim 25, further comprising presenting at least a portion of the performance report for viewing.

32. The method of claim 25, further comprising selecting the monitoring configuration from a plurality of monitoring configurations based on at least one of a type of the wireless device, an identity of a network service provider associated with the wireless device, and a communication protocol associated with the wireless device.

33. At least one processor configured to perform the actions of:
    receiving a control command to execute a performance module on a wireless device to obtain performance statistics, wherein the control command comprises a user identifier and a control activity, wherein the user identifier identifies an originator of the control command;
    generating a permission decision that determines whether or not the control command is authorized, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;
    generating a monitoring configuration executable to initiate monitoring, calculating and reporting of at least one performance statistic on the wireless device if the permission decision determines that the control command is authorized, the monitoring configuration identifying a performance parameter;
    forwarding the monitoring configuration for receipt by the wireless device;
    receiving a calculated performance statistic from the wireless device based on the monitoring configuration;
    generating a performance report based on the received performance statistic; and
    forwarding wireless device performance-related data to another device via a limited-access communications channel across a wireless network based on a predefined limited service configuration.

34. A non-transitory machine-readable medium comprising instructions which, when executed by a machine, cause the machine to perform operations comprising:
    receiving a control command to execute a performance module on a wireless device to obtain performance statistics, wherein the control command comprises a user identifier and a control activity, wherein the user identifier identifies an originator of the control command;

generating a permission decision that determines whether or not the control command is authorized, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;

generating a monitoring configuration executable to initiate monitoring, calculating and reporting of at least one performance statistic on the wireless device if the permission decision determines that the control command is authorized, the monitoring configuration identifying a performance parameter;

forwarding the monitoring configuration for receipt by the wireless device;

receiving a calculated performance statistic from the wireless device based on the monitoring configuration;

generating a performance report based on the received performance statistic; and forwarding wireless device performance-related data to another device via a limited-access communications channel across a wireless network based on a predefined limited service configuration.

35. An apparatus, comprising:

means for receiving a control command to execute a performance module on a wireless device to obtain performance statistics, wherein the control command comprises a user identifier and a control activity, wherein the user identifier identifies an originator of the control command;

means for generating a permission decision that determines whether or not the control command is authorized, wherein the permission decision is based on a comparison of the user identifier and the control activity in the control command with a plurality of authorized user identifiers correlated to a plurality of authorized control permissions, wherein each control permission identifies at least one authorized control activity permitted to an authorized user, whereby unauthorized users are prohibited to perform one or more control activities on the mobile device;

means for generating a monitoring configuration executable to initiate monitoring, calculating and reporting of at least one performance statistic on the wireless device if the permission decision determines that the control command is authorized, the monitoring configuration identifying a performance parameter;

means for forwarding the monitoring configuration for receipt by the wireless device;

means for receiving a calculated performance statistic from the wireless device based on the monitoring configuration;

means for generating a performance report based on the received performance statistic; and means for forwarding wireless device performance-related data to another device via a limited-access communications channel across a wireless network based on a predefined limited service configuration.

36. An apparatus for managing the monitoring of performance data of a wireless device, comprising:

a memory comprising a received control command to obtain performance statistics from a wireless device, wherein the control command comprises a user identifier and a control activity, wherein the user identifier identifies an originator of the control command;

a processor;

a device control module executable by the processor, wherein the device control module comprises permission logic and a plurality of authorized user identifiers correlated to a plurality of authorized control permissions, wherein the permission logic is executable to generate a permission decision that determines whether or not the control command is authorized, wherein the permission decision is based on a comparison of the user identifier and the control activity in the control command with the plurality of authorized user identifiers correlated to the plurality of authorized control permissions, wherein each control permission identifies at least one authorized control activity permitted to an authorized user, whereby unauthorized users are prohibited to perform one or more control activities on the mobile device;

a configuration generator operable to generate and transmit a monitoring configuration for receipt by the wireless device if the permission decision determines that the control command is authorized, the monitoring configuration identifying a performance parameter;

an information repository operable to receive and store wireless device performance statistics, the wireless device performance statistics comprising statistics associated with the performance parameter collected by the wireless device based on the monitoring configuration; and a performance manager control module comprising a report generator operable to generate a performance report based on the wireless device performance statistics, wherein the performance manager is operable to establish a limited-access communications channel with the wireless device across a wireless network, wherein the limited-access communications channel is based on a predefined limited service configuration, wherein the limited-access communications channel is not available to an end user of the device, and wherein the transmitting of the monitoring configuration or the receiving of the wireless device performance statistics is operable via the limited-access communications channel.

37. The apparatus of claim 36, wherein the monitoring configuration further comprises a predetermined threshold setting identifying a limit corresponding to the wireless device performance statistic, wherein the performance report comprises an exception report when the wireless device performance statistic meets the predefined threshold setting.

38. The apparatus of claim 36, wherein the performance manager control module is further operable to transmit at least a portion of the performance report across a wireless network for analysis.

39. The apparatus of claim 36, wherein the performance manager control module is further operable to allow an authorized user to access the performance report.

40. The apparatus of claim 36, wherein the device control module is further operable to send the control command to the wireless device if the permission decision determines that the control command is authorized.

41. The apparatus of claim 40, wherein the device control module is operable to receive the control command from another computer device located across a wireless network.

42. The apparatus of claim 36, wherein the performance parameter identifies for monitoring at least one of a call drop-related metric, an access failure-related metric, and a service degradation-related metric.

43. The apparatus of claim 36, wherein the control command further comprises a wireless device identifier, wherein the device control module further comprises a plurality of wireless device identifiers correlated to the plurality of authorized user identifiers and the plurality of authorized control permissions, and wherein the permission decision is further based on a comparison of the wireless device identifier, the user identifier and the control activity in the control command with the plurality of wireless device identifiers correlated to the plurality of authorized user identifiers and the plurality of authorized control permissions.

44. The method of claim 1, wherein receiving the control command further comprises receiving a wireless device identifier, and wherein generating the permission decision is further based on a comparison of the wireless device identifier, the user identifier and the control activity in the control command with a plurality of wireless device identifiers correlated to the plurality of authorized user identifiers and the plurality of authorized control permissions.

45. The non-transitory machine-readable medium of claim 12, wherein receiving the control command further comprises receiving a wireless device identifier, and wherein generating the permission decision is further based on a comparison of the wireless device identifier, the user identifier and the control activity in the control command with a plurality of wireless device identifiers correlated to the plurality of authorized user identifiers and the plurality of authorized control permissions.

46. The at least one processor of claim 13, wherein receiving the control command further comprises receiving a wireless device identifier, and wherein generating the permission decision is further based on a comparison of the wireless device identifier, the user identifier and the control activity in the control command with a plurality of wireless device identifiers correlated to the plurality of authorized user identifiers and the plurality of authorized control permissions.

47. The wireless device of claim 14, wherein the means for receiving the control command further comprises means for receiving a wireless device identifier, and wherein the means for generating the permission decision is further based on a comparison of the wireless device identifier, the user identifier and the control activity in the control command with a plurality of wireless device identifiers correlated to the plurality of authorized user identifiers and the plurality of authorized control permissions.

48. The wireless device of claim 15, wherein the control command further comprises a wireless device identifier, wherein the device control module further comprises a plurality of wireless device identifiers correlated to the plurality of authorized user identifiers and the plurality of authorized control permissions, and wherein the permission decision is further based on a comparison of the wireless device identifier, the user identifier and the control activity in the control command with the plurality of wireless device identifiers correlated to the plurality of authorized user identifiers and the plurality of authorized control permissions.

49. The method of claim 25, further comprising establishing a limited-access communications channel with the wireless device across a wireless network, wherein the limited-access communications channel is based on a predefined limited service configuration, wherein the limited-access communications channel is not available to an end user of the device, and wherein the forwarding of the monitoring configuration or receiving of the calculated performance statistic operates via the limited-access communications channel.

50. The method of claim 25, wherein receiving the control command further comprises receiving a wireless device identifier, and wherein generating the permission decision is further based on a comparison of the wireless device identifier, the user identifier and the control activity in the control command with a plurality of wireless device identifiers correlated to the plurality of authorized user identifiers and the plurality of authorized control permissions.

51. The at least one processor of claim 33, wherein receiving the control command further comprises receiving a wireless device identifier, and wherein generating the permission decision is further based on a comparison of the wireless device identifier, the user identifier and the control activity in the control command with a plurality of wireless device identifiers correlated to the plurality of authorized user identifiers and the plurality of authorized control permissions.

52. The non-transitory machine-readable medium of claim 34, wherein receiving the control command further comprises receiving a wireless device identifier, and wherein generating the permission decision is further based on a comparison of the wireless device identifier, the user identifier and the control activity in the control command with a plurality of wireless device identifiers correlated to the plurality of authorized user identifiers and the plurality of authorized control permissions.

53. The apparatus of claim 35, wherein the means for receiving the control command further comprises means for receiving a wireless device identifier, and wherein the means for generating the permission decision is further based on a comparison of the wireless device identifier, the user identifier and the control activity in the control command with a plurality of wireless device identifiers correlated to the plurality of authorized user identifiers and the plurality of authorized control permissions.

54. The non-transitory machine-readable medium of claim 12, wherein the limited-access communications channel is not available to an end user of the wireless device.

55. The at least one processor of claim 13, wherein the limited-access communications channel is not available to an end user of the wireless device.

56. The wireless device of claim 14, wherein the limited-access communications channel is not available to an end user of the wireless device.

* * * * *